United States Patent
Jun et al.

(10) Patent No.: US 9,564,074 B2
(45) Date of Patent: Feb. 7, 2017

(54) SYSTEM AND METHOD FOR LUMINANCE CORRECTION

(71) Applicant: SAMSUNG DISPLAY CO., LTD., Yongin, Gyeonggi-Do (KR)

(72) Inventors: Byung-Geun Jun, Yongin (KR); Min-Cheol Kim, Yongin (KR); In-Hwan Kim, Yongin (KR); An-Su Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 121 days.

(21) Appl. No.: 14/528,792

(22) Filed: Oct. 30, 2014

(65) Prior Publication Data
US 2015/0123957 A1 May 7, 2015

(30) Foreign Application Priority Data
Nov. 4, 2013 (KR) .................. 10-2013-0132894

(51) Int. Cl.
| | |
|---|---|
| *G06F 3/038* | (2013.01) |
| *G09G 5/00* | (2006.01) |
| *G09G 3/00* | (2006.01) |
| *G06T 7/00* | (2006.01) |

(52) U.S. Cl.
CPC ............ *G09G 3/006* (2013.01); *G06T 7/0002* (2013.01); *G06T 2207/30121* (2013.01); *G06T 2207/30168* (2013.01); *G09G 2320/0276* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 2005/0200723 A1 | 9/2005 | Kondo et al. | |
| 2009/0135211 A1 | 5/2009 | Wang et al. | |
| 2014/0267784 A1* | 9/2014 | Rykowski | G09G 3/006 348/189 |
| 2015/0116387 A1 | 4/2015 | Jun et al. | |

FOREIGN PATENT DOCUMENTS

| | | |
|---|---|---|
| JP | 2001-54126 | 2/2001 |
| KR | 10-2005-0051535 | 6/2005 |
| KR | 10-2010-0008840 | 1/2010 |

* cited by examiner

*Primary Examiner* — Ilana Spar
*Assistant Examiner* — Kirk Hermann
(74) *Attorney, Agent, or Firm* — Lewis Roca Rothgerber Christie LLP

(57) ABSTRACT

A system and a method for luminance correction that can remove luminance spots of a display device. The system includes a display device, an image detection unit, and a luminance correction device. The display device includes a plurality of sub-pixels including first sub-pixels and corresponding second sub-pixels. The image detection unit is configured to measure respective luminance values of the first sub-pixels. The luminance correction device is configured to supply test data so that only the first sub-pixels emit light, and to calculate correction values corresponding to the plurality of sub-pixels based on difference values between the respective luminance values measured by the image detection unit and one or more target luminance values.

13 Claims, 4 Drawing Sheets

SYSTEM AND METHOD FOR LUMINANCE CORRECTION

CROSS-REFERENCE TO RELATED APPLICATION

This application claims priority to and the benefit of Korean Patent Application No. 10-2013-0132894, filed on Nov. 4, 2013 in the Korean Intellectual Property Office, the entire content of which is incorporated herein by reference.

BACKGROUND

1. Field

Aspects of embodiments of the present invention relate to a system and a method for luminance correction.

2. Description of the Related Art

Recently, there have been developed various types of flat panel displays capable of having reduced weight and volume in comparison to other displays, such as cathode ray tube displays. The flat panel displays include liquid crystal displays (LCDs), field emission displays (FEDs), plasma display panels (PDPs), organic light emitting displays, and the like. Among these flat panel displays, the organic light emitting displays display images using organic light emitting diodes (OLEDs) that emit light through recombination of electrons and holes. Organic light emitting displays have fast response speed and display clear images.

SUMMARY

Embodiments of the present invention provide for a system and a method for luminance correction that can reduce or remove luminance spots of a display device.

In an embodiment of the present invention, a system for luminance correction is provided. The system includes a display device including a plurality of sub-pixels including first sub-pixels and corresponding second sub-pixels, an image detection unit configured to measure respective luminance values of the first sub-pixels, and a luminance correction device configured to supply test data so that only the first sub-pixels emit light, and to calculate correction values corresponding to the plurality of sub-pixels based on difference values between the respective luminance values measured by the image detection unit and one or more target luminance values.

The luminance correction device may include a first correction unit configured to calculate first correction values corresponding to the first sub-pixels based on the difference values, and a second correction unit configured to calculate second correction values corresponding to the second sub-pixels based on respective ones of the first correction values.

The first sub-pixels may include green sub-pixels, and the second sub-pixels may include red sub-pixels and blue sub-pixels.

The second correction unit may be further configured to read the second correction values corresponding to the first correction values from a look-up table.

The luminance correction device may be further configured to write correction data including the correction values in a memory of the display device.

The display device may be configured to correct image data supplied from outside the display device based on the correction data stored in the memory, and to emit light based on the corrected image data.

The luminance correction device may be further configured to calculate the correction values of all gray levels through an interpolation operation using first reference correction values calculated when the luminance correction device supplies first test data corresponding to a first reference gray level, and second reference correction values calculated when the luminance correction device supplies second test data corresponding to a second reference gray level.

In another embodiment of the present invention, a method for luminance correction of a plurality of sub-pixels including first sub-pixels and corresponding second sub-pixels is provided. The method includes: supplying test data so that only the first sub-pixels emit light; measuring a luminance value of each of the first sub-pixels that emit light in response to the test data; and calculating correction values corresponding to the plurality of sub-pixels based on difference values between respective ones of the measured luminance values and one or more target luminance values.

The calculating of the correction values may include calculating first correction values corresponding to the first sub-pixels based on the difference values, and calculating second correction values corresponding to second sub-pixels based on respective ones of the first correction values.

The first sub-pixels may include green sub-pixels, and the second sub-pixels may include red sub-pixels and blue sub-pixels.

The calculating of the second correction values may include reading the second correction values from a look-up table based on the first correction values.

The method may further include writing correction data including the correction values in a memory of a display device.

The method may further include correcting image data supplied from outside the display device based on the correction data stored in the memory, and emitting light based on the corrected image data.

The calculating of the correction values may further include calculating the correction values of all gray levels through an interpolation operation using first reference correction values calculated after supplying first test data corresponding to a first reference gray level and second reference correction values calculated after supplying second test data corresponding to a second reference gray level.

BRIEF DESCRIPTION OF THE DRAWINGS

Example embodiments of the present invention will now be described more fully hereinafter with reference to the accompanying drawings. However, the present invention may be embodied in different forms and should not be construed as limited to the embodiments set forth herein. Rather, these embodiments are provided to more fully convey the scope of the present invention to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
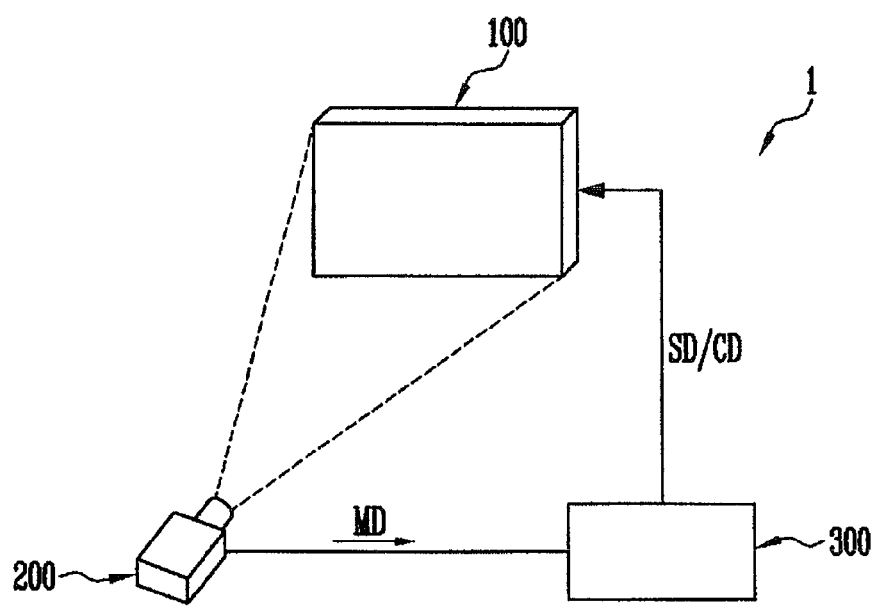
FIG. 1 is a conceptual diagram illustrating a system for luminance correction according to an embodiment of the present invention.

Hereinafter, certain exemplary embodiments according to the present invention will be described with reference to the accompanying drawings. Here, when a first element is described as being coupled to a second element, the first element may be directly coupled (e.g., connected) to the second element or may be indirectly coupled (e.g., electrically connected) to the second element via one or more third elements. Further, some of the elements that are not essential to the complete understanding of the invention may be omitted for clarity. In addition, like reference numerals refer to like elements throughout.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Figure 2:
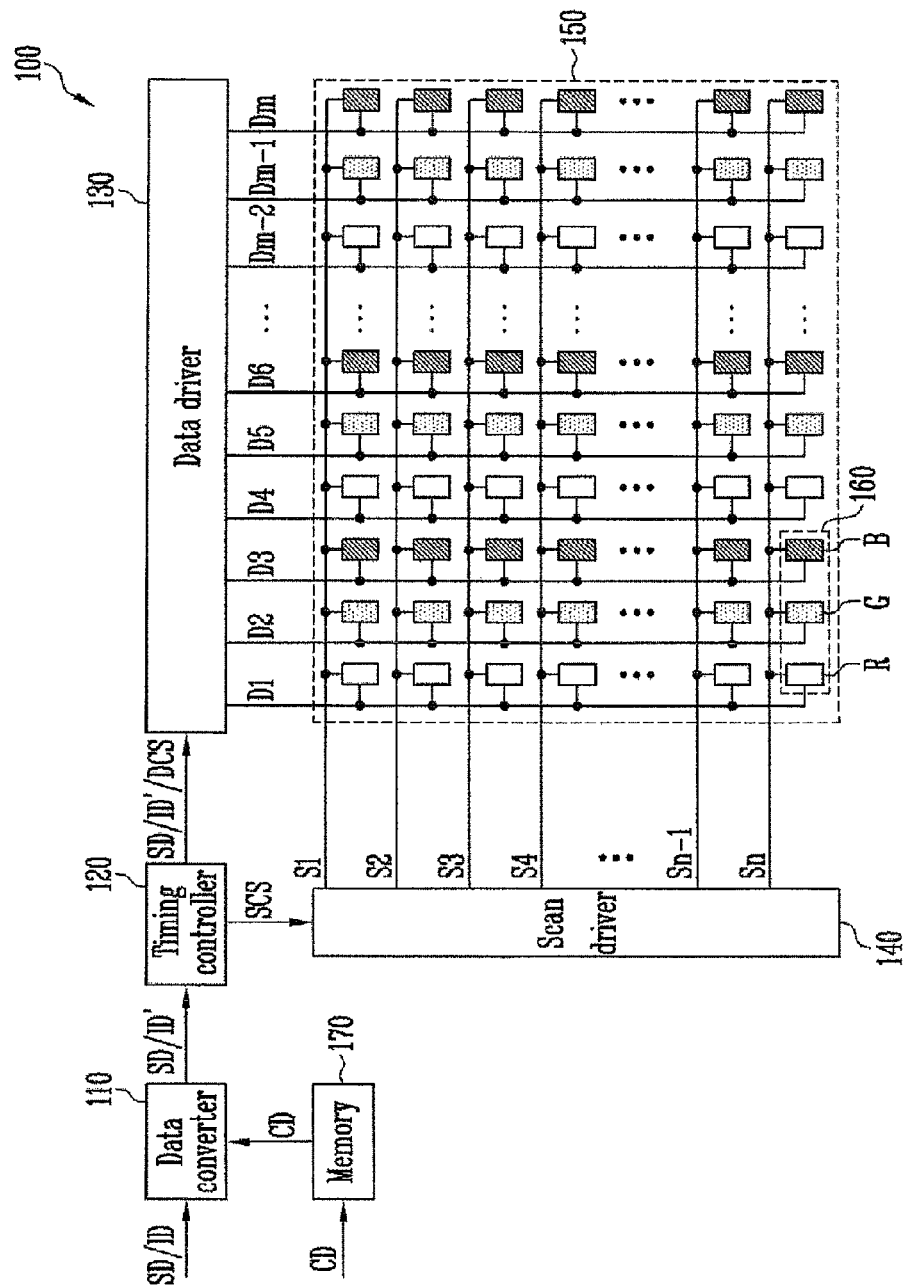
FIG. 2 is a block diagram illustrating a display device shown in FIG. 1.
Figure 3:
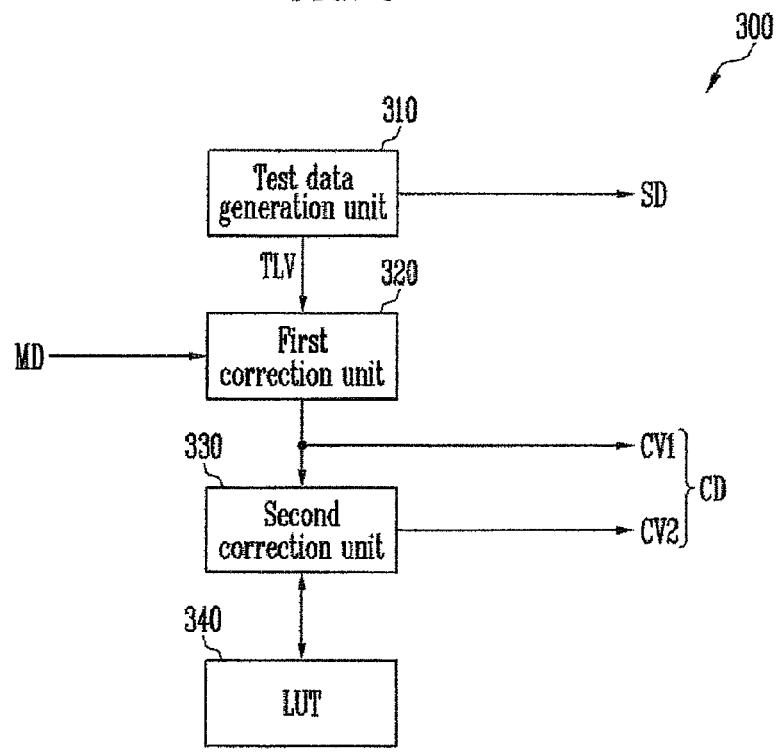
FIG. 3 is a block diagram illustrating a luminance correction device shown in FIG. 1.

FIG. 1 is a conceptual diagram illustrating a luminance correction system 1 according to an embodiment of the present invention. FIG. 2 is a block diagram illustrating a display device 100 shown in FIG. 1. FIG. 3 is a block diagram illustrating a luminance correction device 300 shown in FIG. 1. Referring to FIGS. 1 to 3, the luminance correction system 1 includes the display device 100, an image detection unit 200, and the luminance correction device 300.

The display device 100 displays an image in response to test data SD supplied from the luminance correction device 300 or image data ID supplied from outside the display device 100. The display device 100 stores correction data CD supplied from the luminance correction device 300 in a memory 170 (such as a solid-state memory or other electronic storage device, including, e.g., a nonvolatile storage device). The display device 100 converts the image data ID into converted image data ID' based on the correction data CD stored in the memory 170, and displays an image corresponding to the converted image data ID'.

As illustrated in FIG. 2, in addition to the memory 170, the display device 100 includes a data converter 110, a timing controller 120, a data driver 130, a scan driver 140, and a display unit 150. The data converter 110 converts the image data ID based on the correction data CD stored in the memory 170, and supplies the converted image data ID' to the timing controller 120.

The timing controller 120 controls operations of the data driver 130 and the scan driver 140 in response to a synchronization signal supplied from outside the timing controller 120. In further detail, the timing controller 120 generates data driving control signals DCS and supplies the generated data driving control signals DCS to the data driver 130. The timing controller 120 also generates scan driving control signals SCS and supplies the generated scan driving control signals SCS to the scan driver 140. The timing controller 120 synchronizes the test data SD supplied from the luminance correction device 300, or the converted image data ID' supplied from the data converter 110, with the data driving control signals DCS and the scan driving control signals SCS, and supplies the synchronized data to the data driver 130.

The data driver 130 realigns the test data SD or the converted image data ID' in response to the data driving control signals DCS output from the timing controller 120, and supplies the realigned test data SD or image data ID' as data signals to data lines D1 to Dm. The scan driver 140 progressively supplies a scan signal to scan lines S1 to Sn in response to the scan driving control signals SCS output from the timing controller 120.

The display unit 150 includes pixels 160 respectively disposed at crossing regions of the data lines D1 to Dm and the scan lines S1 to Sn. Each pixel 160 includes a plurality of sub-pixels R, G, and B (for emitting light corresponding to, for example, red, green, and blue, respectively). Here, the data lines D1 to Dm are arranged in a vertical direction, and the scan lines S1 to Sn are arranged in a horizontal direction. Each of the sub-pixels R, G, and B is coupled to a corresponding data line among the data lines D1 to Dm and a corresponding scan line among the scan lines S1 to Sn.

The image detection unit 200 detects an image displayed in the display device 100. In further detail, the image detection unit 200 measures luminance values of the plurality of sub-pixels R, G, and B, and generates measurement data MD including the measured luminance values. The image detection unit 200 supplies the generated measurement data MD to the luminance correction device 300.

According to an embodiment, the image detection unit 200 may be implemented with a charged coupled device (CCD) camera. In the image detection unit 200, image detection devices, e.g., CCD devices, may be arranged to correspond to each pixel 160 or sub-pixel R, G, and B of the display device 100. For example, three CCD devices may be arranged to correspond to one pixel 160 (such as one CCD device for each sub-pixel R, G, and B). In another embodiment, the image detection unit may include one CCD device for each pixel 160, for example, to measure the luminance of the sub-pixel G in each pixel 160.

The luminance correction device 300 generates correction data CD based on the test data SD supplied to the display device 100 and the measurement data MD supplied from the image detection unit 200. The luminance correction device 300 generates test data SD. For example, the luminance correction device 300 may generate test data SD that allows only first sub-pixels to emit light among the plurality of sub-pixels R, G, and B, and supplies the generated test data SD to the display device 100. The luminance correction device 300 may be implemented, for example, as a microprocessor with computer instructions stored on a nonvolatile storage device that, when executed on the microprocessor, cause the microprocessor to perform the steps of the luminance correction device 300, as would be apparent to one of ordinary skill in the art.

In this specification, the term "first sub-pixels" refers to sub-pixels of a particular color set that emit light in response to the test data SD among the plurality of sub-pixels R, G, and B. Likewise, the term "second sub-pixels" refers to sub-pixels of the other colors (that is, different from the first sub-pixels) among the plurality of sub-pixels R, G, and B. Here, the color that is most viewed (e.g., most visible) to a human among the three primary colors (e.g., red, blue, and green) is green, and therefore, green sub-pixels may be set as the first sub-pixels.

The luminance correction device 300 analyzes the measurement data MD and generates the correction data CD based on the analysis results. Here, the correction data CD includes first correction values CV1 corresponding to the first sub-pixels and second correction values CV2 corresponding to the second sub-pixels.

The luminance correction device 300 calculates the first correction values CV1 corresponding to the first sub-pixels directly based on the measurement data MD. The luminance correction device 300 calculates the second correction values CV2 based on the first correction values CV1. The relationship between the first correction values CV1 and the second correction values CV2 may be changed depending on factors such as the materials constituting each sub-pixel, etc. The first correction values CV1 and the second correction values CV2 may be calculated through experiments. The luminance correction device 300 writes the correction data CD in the memory 170 of the display device 100.

The luminance correction device 300 in FIG. 3 includes a test data generation unit 310, a first correction unit 320, a second correction unit 330, and a look-up table 340. The test data generation unit 310 generates test data SD corresponding to one or more reference gray levels, such as predetermined reference gray levels. The test data generation unit 310 may generate test data SD that allows only the first sub-pixels among the plurality of sub-pixels R, G, and B to emit light. The test data generation unit 310 supplies the generated test data SD to the display device 100.

In addition, the test data generation unit 310 generates target luminance values TLV corresponding to the reference gray levels included in the test data SD. Here, the target luminance values TLV refer to luminance values where each first reference pixel emits light in response to the reference gray levels included in the test data SD, when each first reference pixel is manufactured without any error according to the design thereof. The test data generation unit 310 supplies the generated target luminance values TLV to the first correction unit 320.

The first correction unit 320 calculates first correction values CV1 corresponding to the first sub-pixels among the plurality of sub-pixels R, G, and B based on the measurement data MD supplied from the image detection unit 200 and the target luminance values TLV supplied from the test data generation unit 310. In further detail, the first correction unit 320 calculates difference values between luminance values included in the measurement data MD and the target luminance values TLV. The first correction unit 320 calculates first correction values CV1 corresponding to the first sub-pixels based on the difference values.

According to an embodiment, the first correction values CV1 and the second correction values CV2 may be constants respectively corresponding to gray levels. In this case, the first correction unit 320, for example, increases the first correction values CV1 when the difference between each luminance value and the corresponding target luminance value TLV is large. On the contrary, the first correction unit 320 decreases the first correction values CV1 when the difference between each luminance value and the corresponding target luminance value TLV is small. According to another embodiment, the first correction values CV1 and the second correction values CV2 may be parameters of a function, such as a predetermined function.

The first correction unit 320 writes the calculated first correction values CV1 in the memory 170 of the display device 100. In addition, the first correction unit 320 supplies the calculated first correction values CV1 to the second correction unit 330.

The second correction unit 330 calculates second correction values CV2 corresponding to the second sub-pixels among the plurality of sub-pixels R, G, and B based on the first correction values CV1 supplied from the first correction unit 320. In further detail, the second correction unit 330 reads the second correction values CV2 corresponding to the first correction values CV1 from the look-up table 340, and writes the looked-up second correction values CV2 in the memory 170 of the display device 100.

The look-up table 340 stores the second correction values CV2 corresponding to the first correction values CV1. The information stored in the look-up table 340 may be, for example, calculated through a plurality of experiments that have been previously performed. The look-up table 340 may be, for example, a nonvolatile storage device such as a solid-state memory device.

The characteristic of each of the plurality of sub-pixels R, G, and B may be changed depending on a material constituting each of the plurality of sub-pixels R, G, and B. The characteristic changed depending on the material as described above is an item that is necessarily considered in advance when the display device 100 is designed. That is, if the display device 100 is manufactured according to its intended design, the luminance variation between the plurality of sub-pixels R, G, and B is mostly caused by a variation in a manufacturing process. Generally, the variation in the manufacturing process commonly occurs in the plurality of sub-pixels R, G, and B. Thus, although the first correction values CV1 corresponding to the first sub-pixels are directly calculated through image detection and the second correction values CV2 corresponding to the second sub-pixels are estimated based on the first correction values CV1, it is possible to perform exact or very precise luminance correction.

Figure 4:
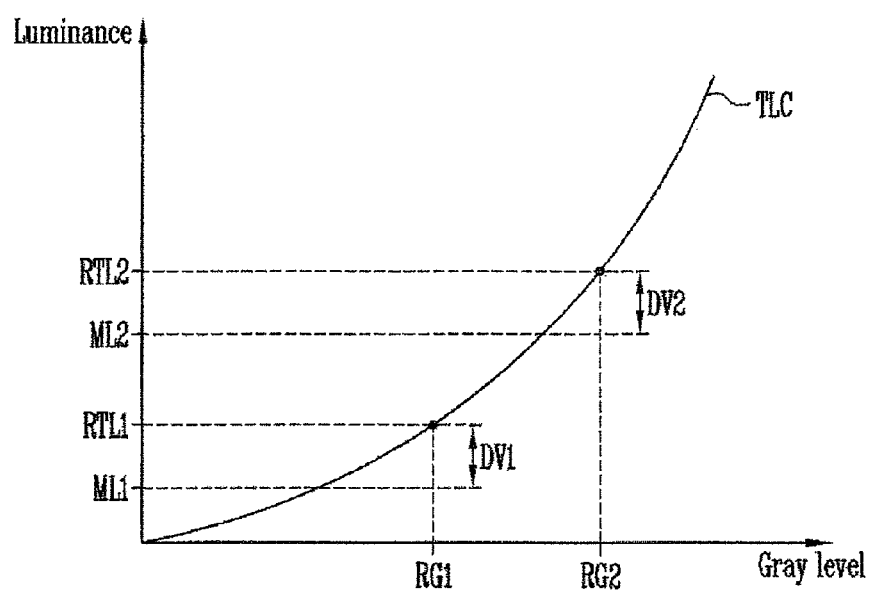
FIG. 4 is a graph illustrating an operation of the luminance correction device shown in FIG. 1.

FIG. 4 is a graph illustrating an operation of the luminance correction device shown in FIG. 1. Referring to FIGS. 1 to 4, the luminance correction device 300 may generate the correction data CD corresponding to all the gray levels based on measurement data measured with a small number of reference gray levels, such as reference gray levels RG1 and RG2.

In an embodiment of the present invention, the test data generation unit 310 supplies, to the display device 100, first test data SD1 corresponding to a first reference gray level RG1. The first sub-pixels of the display device 100 emit light in response to the first test data SD1. The image detection unit 200 measures first luminance values ML1 of the first sub-pixels that emit light in response to the first test data SD1, and supplies the measurement data MD including the measured first luminance values ML1 to the first correction unit 320. The first correction unit 320 calculates first difference values DV1 between the respective measured luminance values ML1 and a first reference target luminance value RTL1. The first correction unit 320 calculates first reference correction values RCV1 based on the first difference values DV1.

Subsequently, the test data generation unit 310 supplies, to the display device 100, a second test data SD2 corresponding to a second reference gray level RG2. The first sub-pixels of the display device 100 emit light in response to the second test data SD2. The image detection unit 200 measures second luminance values ML2 of the first sub-pixels that emit light in response to the second test data SD2, and supplies the measurement data MD including the measured second luminance values ML2 to the first correction unit 320. The first correction unit 320 calculates second difference values DV2 between the respective measured luminance values ML2 and a second reference target luminance value RTL2. The first correction unit 320 calculates second reference correction values RCV2 based on the second difference values DV2.

Here, the first reference target luminance value RTL1 is a value corresponding to the first reference gray level RG1 on the target luminance curve TLC, and the second reference target luminance value RTL2 is a value corresponding to the second reference gray level RG2 on the target luminance curve TLC. The first correction unit 320 calculates first correction values CV1 of all the gray levels through, for example, an interpolation or extrapolation (or other estimation) operation using the first reference correction values RCV1 and the second reference correction values RCV2. The second correction unit 330 calculates second correction values CV2 corresponding to the first correction values CV1. In another embodiment, calculation of the first correction values CV1 is done using one test data and corresponding reference target luminance value and reference correction value (for example, to simplify the correction process. In still other embodiments, calculation of the first correction values CV1 is done using more than two sets of test data and corresponding reference target luminance values and reference correction values (for example, to improve interpolation accuracy).

Figure 5:
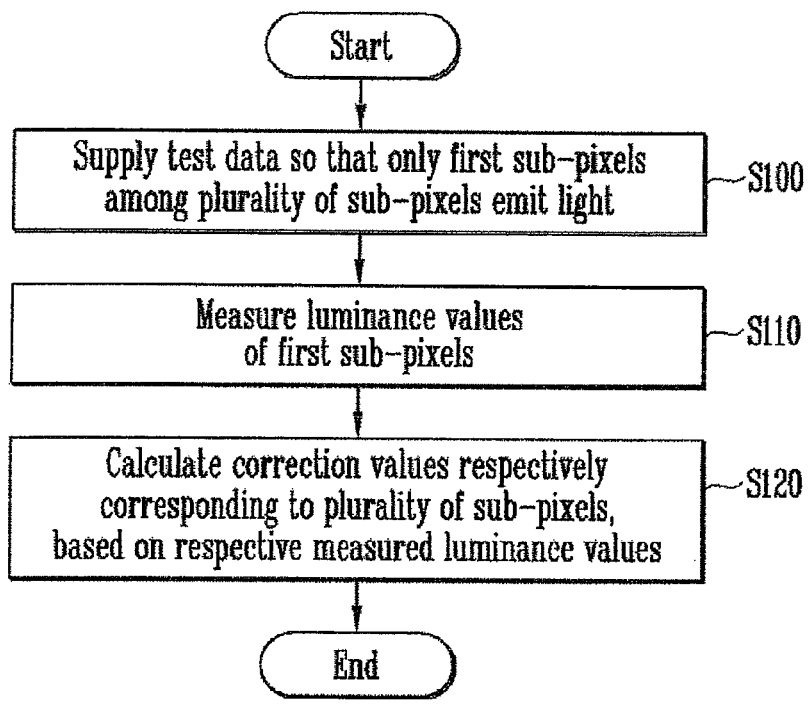
FIG. 5 is a flowchart illustrating a method for luminance correction according to an embodiment of the present invention.
Figure 6:
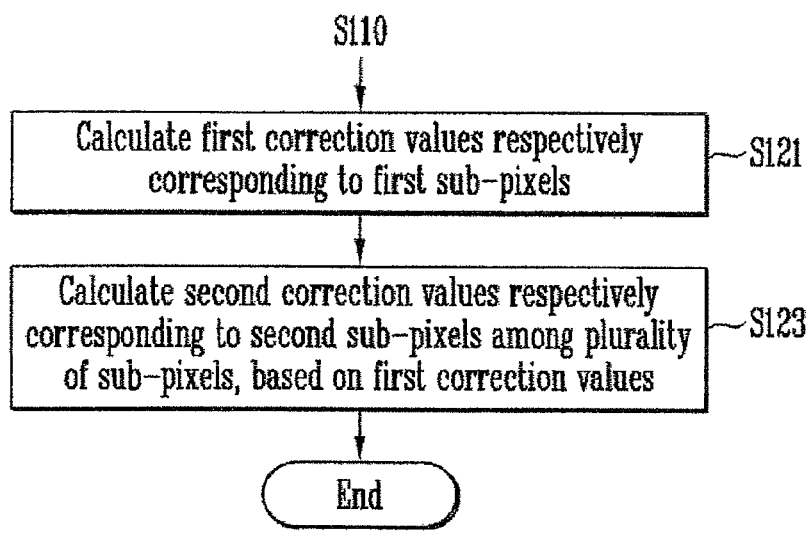
FIG. 6 is a flowchart illustrating a step of calculating correction values shown in FIG. 5.

FIG. 5 is a flowchart illustrating a method for luminance correction according to an embodiment of the present invention. FIG. 6 is a flowchart illustrating a step of calculating correction values shown in FIG. 5.

Referring to FIGS. 5 and 6, the luminance correction device 300 supplies test data SD so that only the first sub-pixels among the plurality of sub-pixels R, G, and B emit light, while the second sub-pixels among the plurality of sub-pixels R, G, and B do not emit light. The first sub-pixels emit light in response to the test data SD (S100). The image detection unit 200 measures a luminance value of each first sub-pixel, and supplies the measurement data MD including the measured luminance values to the luminance correction device 300 (S110). The luminance correction device 300 calculates correction values CV1 and CV2 respectively corresponding to the first sub-pixels and the second sub-pixels of plurality of sub-pixels R, G, and B based on difference values between the respective measured luminance values included in the measurement data MD and target luminance values (S120).

In further detail, the first correction unit 320 of the luminance correction device 300 calculates first correction values CV1 respectively corresponding to the first sub-pixels based on the difference values between the respective measured luminance values included in the measurement data MD and the target luminance values (S121). The second correction unit 330 of the luminance correction device 300 calculates second correction values CV2 respectively corresponding to the second sub-pixels based on the respective first correction values CV1 calculated by the first correction unit 320 (S123).

The luminance correction device 300 writes correction data CV including the calculated correction values CV1 and CV2 in the memory 170 of the display device 100. Subsequently, the display device 100 converts image data ID supplied from outside the display device 100 based on the correction data CV stored in the memory 170, and displays the converted image data ID, thereby improving image quality by, for example, removing one or more luminance spots or other luminance imperfections.

By way of summation and review, in flat panel displays (including organic light emitting displays), luminance variation between pixels may occur due to factors such as characteristic variation of the pixels, variation in manufacturing processes, and the like. According to the luminance variation as described above, one or more luminance spots may occur in a flat panel display, and therefore, the image quality of the flat panel display may be deteriorated. In the system and method for luminance correction according to embodiments of the present invention, it is possible to remove luminance spots of the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:

1. A system for luminance correction, the system comprising:
 a display device including a plurality of sub-pixels comprising first sub-pixels and corresponding second sub-pixels;
 an image detection unit configured to measure respective luminance values of the first sub-pixels; and
 a luminance correction device configured
  to supply test data so that only the first sub-pixels emit light,
  to calculate first correction values corresponding to the first sub-pixels based on difference values between the respective luminance values measured by the image detection unit and one or more target luminance values, and
  to calculate second correction values corresponding to the second sub-pixels based on respective ones of the first correction values.

2. The system of claim 1, wherein the luminance correction device comprises:
 a first correction unit configured to calculate the first correction values; and
 a second correction unit configured to calculate the second correction values.

3. The system of claim 2, wherein the first sub-pixels comprise green sub-pixels, and the second sub-pixels comprise red sub-pixels and blue sub-pixels.

4. The system of claim 2, wherein the second correction unit is further configured to read the second correction values corresponding to the first correction values from a look-up table.

5. The system of claim 1, wherein the luminance correction device is further configured to write correction data including the first and second correction values in a memory of the display device.

6. The system of claim 5, wherein the display device is configured
 to correct image data supplied from outside the display device based on the correction data stored in the memory, and
 to emit light based on the corrected image data.

7. The system of claim 1, wherein the luminance correction device is further configured to calculate the first correction values of all gray levels through an interpolation operation using first reference correction values calculated when the luminance correction device supplies first test data corresponding to a first reference gray level, and second reference correction values calculated when the luminance correction device supplies second test data corresponding to a second reference gray level.

8. A method for luminance correction of a display device including a plurality of sub-pixels comprising first sub-pixels and corresponding second sub-pixels, the method comprising:

supplying, by a luminance correction device, test data so that only the first sub-pixels emit light;

measuring, by an image detection unit, a luminance value of each of the first sub-pixels that emit light in response to the test data;

calculating, by the luminance correction device, first correction values corresponding to the first sub-pixels based on difference values between respective ones of the measured luminance values and one or more target luminance values; and calculating, by the luminance correction device, second correction values corresponding to the second sub-pixels based on respective ones of the first correction values.

9. The method of claim 8, wherein the first sub-pixels comprise green sub-pixels, and the second sub-pixels comprise red sub-pixels and blue sub-pixels.

10. The method of claim 8, wherein the calculating of the second correction values comprises reading the second correction values from a look-up table based on the first correction values.

11. The method of claim 8, further comprising writing, by the luminance correction device, correction data including the first and second correction values in a memory of the display device.

12. The method of claim 11, further comprising:

correcting, by the display device, image data supplied from outside the display device based on the correction data stored in the memory; and emitting, by the display device, light based on the corrected image data.

13. The method of claim 8, wherein the calculating of the first correction values further comprises calculating the first correction values of all gray levels through an interpolation operation using first reference correction values calculated by the luminance correction device after supplying first test data corresponding to a first reference gray level and second reference correction values calculated by the luminance correction device after supplying second test data corresponding to a second reference gray level.

\* \* \* \* \*